(12) United States Patent
Chung et al.

(10) Patent No.: US 11,949,103 B2
(45) Date of Patent: Apr. 2, 2024

(54) ANODE ELECTRODE ACTIVE MATERIAL FOR SODIUM SECONDARY BATTERY COMPRISING NICKEL COBALT MOLYBDENUM OXIDE, ANODE ELECTRODE FOR SODIUM SECONDARY BATTERY COMPRISING SAME, SODIUM SECONDARY BATTERY INCLUDING ANODE ELECTRODE FOR SODIUM SECONDARY BATTERY, AND METHOD FOR MANUFACTURING SAME

(71) Applicants: KOREA INSTITUTE OF SCIENCE AND TECHNOLOGY, Seoul (KR); Dongguk University Industry—Academic Cooperation Foundation, Seoul (KR)

(72) Inventors: Kyung Yoon Chung, Seoul (KR); Kyung-Wan Nam, Seoul (KR); Jaeho Park, Seoul (KR); Daniel Adjah Anang, Kumasi (GH)

(73) Assignees: Korea Institute of Science and Technology, Seoul (KR); Dongguk University Industry—Academic Cooperation Foundation, Seoul (KR)

( * ) Notice: Subject to any disclaimer, the term of this patent is extended or adjusted under 35 U.S.C. 154(b) by 0 days.

(21) Appl. No.: 18/091,233

(22) Filed: Dec. 29, 2022

(65) Prior Publication Data
US 2023/0146801 A1    May 11, 2023

Related U.S. Application Data

(63) Continuation of application No. 16/990,025, filed on Aug. 11, 2020, now Pat. No. 11,575,131.

(30) Foreign Application Priority Data

Aug. 19, 2019  (KR) .................. 10-2019-0100876

(51) Int. Cl.
| | | |
|---|---|---|
| H01M 4/525 | (2010.01) |
| H01M 4/04 | (2006.01) |
| H01M 4/131 | (2010.01) |
| H01M 4/1391 | (2010.01) |
| H01M 4/36 | (2006.01) |
| H01M 4/66 | (2006.01) |
| H01M 10/058 | (2010.01) |

(52) U.S. Cl.
CPC ......... *H01M 4/525* (2013.01); *H01M 4/0471* (2013.01); *H01M 4/131* (2013.01); *H01M 4/1391* (2013.01); *H01M 4/364* (2013.01); *H01M 4/667* (2013.01); *H01M 10/058* (2013.01)

(58) Field of Classification Search
None
See application file for complete search history.

(56) References Cited

U.S. PATENT DOCUMENTS

| | | |
|---|---|---|
| 6,514,897 B1 | 2/2003 | Moy et al. |
| 2005/0209401 A1 | 9/2005 | Lutz et al. |
| 2011/0159286 A1 | 6/2011 | Park et al. |
| 2015/0364674 A1 | 12/2015 | Sasaki et al. |
| 2021/0367234 A1 | 11/2021 | Sun et al. |

FOREIGN PATENT DOCUMENTS

| | | |
|---|---|---|
| KR | 101440843 B1 | 9/2014 |
| WO | 2019017736 A2 | 1/2019 |

OTHER PUBLICATIONS

Prabhu, S., Maruthapandi, M., Durairaj, A., Kumar, S.A., Luong, J.H.T., Ramesh, R., Gedanken, A .—Performances of Co2+-Substituted NiMoO4 Nanorods in a Solid-State Hybrid Supercapacitor, ACS Appl. Energy Mater, 2023, 6, pp. 1321-1331 (Year: 2023).*
Chen, H. et al., "Synergistic effect of Ni and Co ions on molybdates for superior electrochemical performance", Electrochimica Acta 190 (2016), pp. 57-63 (Year: 2016).
Kyung-Soo Park et al., "Electrochemical performance of Nix Co1-x MoO4 (0 ≤ x ≤ 1) nanowire anodes for lithium-ion batteries", Publication Date: Jan. 5, 2012.
Zhang, X. et al., "Nickel doped cobalt molybdate nanorods with excellent cycle stability for aqueous asymmetric supercapacitors", International of Hydrogen Energy 45 (2020), pp. 8853-8865, available online Feb. 11, 2020 (Year: 2020).
Denis, D.K. et al., "Solid Solution Engineering of Co—Ni-Based Ternary Molybdate Nanorods towards Hybrid Supercapacitors and Lithium-Ion Batteries as High-Performance Electrodes", Applied Energy Materials, 2020.3.3955-3965, published on Mar. 12, 2020 (Year: 2020).
Nanowire, definition by Britannica Online Encyclopedia, https://www.britannica.com/technology/nanowire, Jan. 20, 2017 (Year: 2017).

* cited by examiner

*Primary Examiner* — Anca Eoff
(74) *Attorney, Agent, or Firm* — Rabin & Berdo, P.C.

(57) ABSTRACT

The present disclosure relates to an anode electrode active material for a secondary battery containing nickel cobalt molybdenum oxide, an anode electrode for a secondary battery including the same, a secondary battery including the anode electrode for a secondary battery, and a method for manufacturing the same. The novel anode electrode material for a sodium secondary battery containing nickel cobalt molybdenum oxide according to the present disclosure allows intercalation/deintercalation reaction of sodium ion during charge/discharge and does not undergo significant volume change during the intercalation reaction because structure is maintained stably during repeated charge/discharge. As a result, electrode damage and electric short circuit are decreased and, thus, improved electrochemical characteristics can be achieved in long-life and high-rate capability.

5 Claims, 12 Drawing Sheets

ANODE ELECTRODE ACTIVE MATERIAL FOR SODIUM SECONDARY BATTERY COMPRISING NICKEL COBALT MOLYBDENUM OXIDE, ANODE ELECTRODE FOR SODIUM SECONDARY BATTERY COMPRISING SAME, SODIUM SECONDARY BATTERY INCLUDING ANODE ELECTRODE FOR SODIUM SECONDARY BATTERY, AND METHOD FOR MANUFACTURING SAME

CROSS-REFERENCE TO RELATED APPLICATIONS

This application is a continuation of U.S. application Ser. No. 16/990,025 filed on Aug. 11, 2020. The prior US application and the present continuation application also claim the benefit of priority under 35 U.S.C. § 119, of Korean Patent Application No. 10-2019-0100876 filed on Aug. 19, 2019 in the Korean Intellectual Property Office. The disclosures of these prior US and foreign applications are incorporated herein by reference.

TECHNICAL FIELD

The present disclosure relates to a novel anode electrode material for a sodium secondary battery, which contains nickel cobalt molybdenum oxide synthesized via a one-pot reaction based on a hydrothermal synthesis process, a sodium secondary battery including the same and a method for manufacturing the same. More particularly, it relates to a novel anode electrode material exhibiting improved electrochemical characteristics in long-life and high-rate capability when applied to a sodium secondary battery as an anode electrode material through reversible structural change during charge/discharge as compared to the existing anode electrode material, and a sodium secondary battery including the same.

BACKGROUND

The application of a lithium secondary battery is extending as the markets of energy storage system (ESS) and electric vehicles are extending. However, lithium metal used in the lithium secondary battery is rare and can be obtained only in restricted regions and its price is rising gradually due to rapidly increasing demand for lithium secondary batteries. In addition, there is a limitation in using a lithium-ion battery as an environment-friendly energy storage device due to environmental pollution, etc. occurring during lithium mining. For these reasons, a sodium secondary battery is being developed in order to replace the lithium secondary battery. The sodium secondary battery can be produced at a lower cost than the lithium secondary battery and is advantageous in terms of price because sodium is abundant and distributed uniformly throughout this planet. In addition, since the physical and chemical properties of sodium are similar to those of lithium, the problems occurring during the development of the sodium secondary battery are being overcome quickly using the existing technologies known for the lithium secondary battery. But, sodium ion is 1.3 times larger than lithium ion with an ionic radius of 1.2 Å, and is 3.3 times heavier. In addition, it is disadvantageous over lithium ion because of a potential higher than lithium by 0.33 V. In addition, development of an anode electrode material capable of replacing graphite is necessary because the intercalation/deintercalation reaction of graphite, which has greatly contributed to the commercialization of the lithium secondary battery, hardly occurs in the sodium secondary battery. Accordingly, researches for finding out a new anode electrode material which is low-priced like graphite and exhibits superior life characteristics and high-rate capability are being carried out actively.

Researches on the anode electrode of the sodium secondary battery are focused on carbon-based materials, alloy materials, transition metal oxides, etc. Carbon-based anode electrode materials may be classified into graphite-based materials and non-graphite-based materials. For the graphite-based materials, the reversible intercalation/deintercalation reaction of sodium ion hardly occurs in commonly used carbonate-based electrolytes. The non-graphite-based materials have unsatisfactory life characteristics and high-rate capability. The representative candidates of the alloy anode electrode materials include silicon and tin. Silicon is known to be able to store a large quantity of lithium by reacting with lithium ion and creating a $Li_{15}Si_{14}$ phase. Meanwhile, although it is theoretically known that sodium ion can form a NaSi phase, researches are not being conducted actually because it lacks electrochemical reactivity. Tin has electrochemical reactivity but has the problem of decreased performance caused by volume expansion. The transition metal oxide-based anode electrode materials which store ions through conversion reactions exhibit high theoretical capacity because one or more sodium ion can react with one atom. However, the conversion reaction-based materials exhibit unsatisfactory life characteristics and high-rate capability because existing chemical bonds are broken and new chemical bonds are formed when they react with sodium. At present, various researches are ongoing in order to solve these problems and develop an anode electrode material that can be applied to a sodium secondary battery.

REFERENCES OF THE RELATED ART

Patent Document (Patent document 1) Korean Patent Registration No. 10-1440843.

SUMMARY

The present disclosure is directed to providing a novel anode electrode material for a sodium secondary battery, which exhibits improved electrochemical characteristics in long-life and high-rate capability, and a method for manufacturing a sodium secondary battery containing the same.

The present disclosure is also directed to providing a method for synthesizing nickel cobalt molybdenum oxide, which is a novel anode electrode material, via a one-pot reaction based on a hydrothermal synthesis process.

An aspect of the present disclosure provides an anode electrode active material for a sodium secondary battery, containing nickel cobalt molybdenum oxide represented by Chemical Formula 1, wherein the nickel cobalt molybdenum oxide is comprised of a single phase of Chemical Formula 1 and is in the form of a nanorod.

$Ni_xCo_{1-x}MoO_4$  [Chemical Formula 1]

In Chemical Formula 1, x satisfies 0.45<x<0.55.

Another aspect of the present disclosure provides a method for preparing nickel cobalt molybdenum oxide, including: a step of preparing a precursor mixture by dissolving a nickel precursor, a cobalt precursor and a molybdenum precursor in a solvent (step 1); a step of conducting hydrothermal reaction of the precursor mixture of the step 1 as a reactant (step 2); and a step of heat-treating the product of the step 2 (step 3), wherein the nickel cobalt molybdenum oxide is comprised of a single phase of Chemical Formula 1 and is in the form of a nanorod.

$Ni_xCo_{1-x}MoO_4$ [Chemical Formula 1]

In Chemical Formula 1, x satisfies 0.45<x<0.55.

Another aspect of the present disclosure provides an anode electrode for a sodium secondary battery prepared by a method including: a step of preparing a slurry by mixing the anode electrode active material for a sodium secondary battery, a conductive agent and a binder in a solvent; and a step of coating the slurry on a current collector and then drying the same.

Another aspect of the present disclosure provides a sodium secondary battery including the anode electrode for a sodium secondary battery.

The novel anode electrode material for a sodium secondary battery containing nickel cobalt molybdenum oxide according to the present disclosure allows intercalation/deintercalation reaction of sodium ion during charge/discharge and does not undergo significant volume change during the intercalation reaction because structure is maintained stably during repeated charge/discharge. As a result, electrode damage and electric short circuit are decreased and, thus, improved electrochemical characteristics can be achieved in long-life and high-rate capability.

In addition, the novel anode electrode material for a sodium secondary battery containing nickel cobalt molybdenum oxide is advantageous in that it can be synthesized easily via a simple process such as a one-pot reaction based on a hydrothermal synthesis process.

DETAILED DESCRIPTION OF EMBODIMENTS

Figure 1:
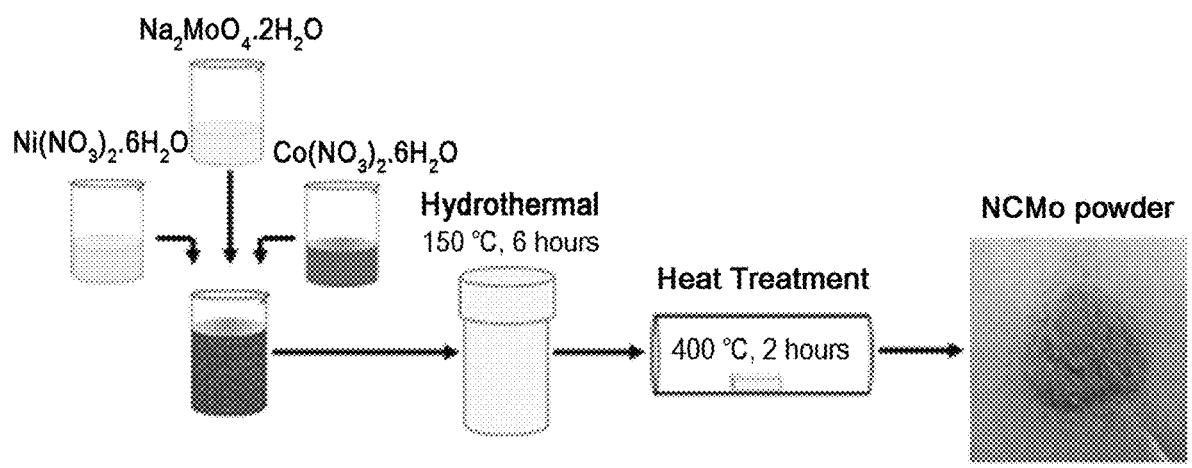
FIG. 1 describes a method for preparing nickel cobalt molybdenum oxide according to an exemplary embodiment of the present disclosure.

Hereinafter, various aspects and exemplary embodiments of the present disclosure are described in more detail.

An aspect of the present disclosure provides an anode electrode active material for a sodium secondary battery, containing nickel cobalt molybdenum oxide represented by Chemical Formula 1, wherein the nickel cobalt molybdenum oxide is comprised of a single phase of Chemical Formula 1 and is in the form of a nanorod.

$Ni_xCo_{1-x}MoO_4$ [Chemical Formula 1]

In Chemical Formula 1, x satisfies 0.45<x<0.55.

The novel anode electrode material for a sodium secondary battery allows intercalation/deintercalation reaction of sodium ion during charge/discharge and does not undergo significant volume change during the intercalation reaction because structure is maintained stably during repeated charge/discharge unlike the metal oxide used in the existing anode electrode active material for a sodium secondary battery. As a result, electrode damage and electric short circuit are decreased and, thus, improved electrochemical characteristics can be achieved in long-life and high-rate capability.

In addition, the nanorod form and the crystal structure of a single phase provide superior electrochemical characteristics as compared to materials of other forms or with simple or complex phases.

In particular, a grain boundary is formed less for the $Ni_xCo_{1-x}MoO_4$ single phase as compared to complex phases (e.g., $NiMoO_4$ and $CoMoO_4$ complex phases). Because the grain boundary can resist the transport of ions or electrons, an anode electrode active material of a single phase is used to minimize it. For this reason, whereas the existing metal oxide anode electrode active material allows transport of Na ion through conversion reaction during charge/discharge, the anode electrode active material for a sodium secondary battery of the present disclosure provides superior electrochemical performance by allowing transport of Na ion through intercalation reaction.

Indeed, although it is a common knowledge that the anode electrode active material for a sodium secondary battery of the present disclosure has electrochemical performance somewhere in between $NiMoO_4$ and $CoMoO_4$, it exhibits superior performance than the two materials by forming a single phase as will be described in detail below.

In addition, since the nanorod form allows more effective surface reaction than the common sheet form and can be easily impregnated into a liquid electrolyte, it provides superior electrochemical characteristics as compared to the sheet form.

As will be described later, the nickel cobalt molybdenum oxide has the desired nanorod form and the prepared sodium secondary battery has improved output characteristics and life characteristics when the x in Chemical Formula 1 satisfies $0.45<x<0.55$.

The nanorod may have a diameter of 50-100 nm. In general, a sheet form is synthesized with a thickness exceeding 100 nm. Because the nanorod form has a small particle size as compared to the sheet form, the passage through which electrons or ions are transported becomes narrow, which can improve electrochemical characteristics. In addition, because the possibility of the presence of impurity phase is increased as the particle size is larger, which leads to unsatisfactory electrochemical characteristics, a nanorod form with a diameter of 50-100 nm is preferred.

Another aspect of the present disclosure provides a method for preparing nickel cobalt molybdenum oxide, including: a step of preparing a precursor mixture by dissolving a nickel precursor, a cobalt precursor and a molybdenum precursor in a solvent (step 1); a step of conducting hydrothermal reaction of the precursor mixture of the step 1 as a reactant (step 2); and a step of heat-treating the product of the step 2 (step 3). The method for preparing nickel cobalt molybdenum oxide is advantageous in that nickel cobalt molybdenum oxide can be synthesized via a simple hydrothermal synthesis process without requiring additional substances such as a surfactant, a precipitator, etc.

The nickel precursor may be one selected from $Ni(NO_3)_2 \cdot 6H_2O$, $NiCl_2 \cdot 6H_2O$ and $Co(CH_3COO)_2 \cdot 4H_2O$ or a mixture of two or more of them, the cobalt precursor may be one selected from $Co(NO_3)_2 \cdot 6H_2O$, $CoCl_2 \cdot 6H_2O$ and $Co(CH_3COO)_2 \cdot 4H_2O$ or a mixture of two or more of them, and the molybdenum precursor may be one selected from $Na_2MoO_4 \cdot 2H_2O$, $(NH_4)_2MoO_4 \cdot 4H_2O$ and $(NH_4)_6Mo_7O_{24} \cdot 4H_2O$ or a mixture of two or more of them.

The hydrothermal reaction may be performed at a temperature of 130-180° C. for 4-9 hours, specifically at a temperature of 150-180° C. for 6-9 hours.

The hydrothermal reaction may be performed at a pressure of 0.4-0.6 MPa. Outside the above pressure range, nickel cobalt molybdenum oxide in a nanorod form may not be prepared.

The heat treatment may be performed with a heating rate of 1-10° C./min at a temperature of 300-500° C. for 3-5 hours, specifically with a heating rate of 3-7° C./min at a temperature of 400-500° C. for 4-5 hours. The heat treatment allows preparation of nickel cobalt molybdenum oxide with a crystal structure as a product of the step 2 and allows intercalation/deintercalation of sodium ion during charge/discharge unlike the existing metal oxide used as an anode electrode active material of a sodium secondary battery. If the heat treatment temperature is below 300° C., nickel cobalt molybdenum oxide with a crystal structure of single phase may not be formed. And, if it exceeds 500° C., unwanted impurity phase may be obtained.

The method for preparing nickel cobalt molybdenum oxide may be achieved via a one-pot reaction. Because the nickel cobalt molybdenum oxide can be prepared via a one-pot reaction based on a hydrothermal synthesis process, the preparation process is simple.

Another aspect of the present disclosure provides nickel cobalt molybdenum oxide prepared according to the method for preparing nickel cobalt molybdenum oxide described above.

Another aspect of the present disclosure provides an anode electrode active material for a sodium secondary battery, which contains the nickel cobalt molybdenum oxide described above.

Another aspect of the present disclosure provides an anode electrode for a sodium secondary battery prepared by a method including: a step of preparing a slurry by mixing the anode electrode active material for a sodium secondary battery, a conductive agent and a binder in a solvent; and a step of coating the slurry on a current collector and then drying the same.

Another aspect of the present disclosure provides a sodium secondary battery including the anode electrode for a sodium secondary battery.

Hereinafter, the present disclosure will be described in more detail through examples. However, the following examples are for illustrative purposes only and not intended to limit the scope of this disclosure. It will be apparent to those of ordinary skill in the art that various changes and modifications can be made within the scope and technical idea of the present disclosure.

Example 1. Preparation of Nickel Cobalt Molybdenum Oxide

FIG. 1 describes a method for preparing nickel cobalt molybdenum oxide according to an exemplary embodiment of the present disclosure. Sodium molybdate dihydrate ($Na_2MoO_4 \cdot 2H_2O$), cobalt nitrate hexahydrate ($Co(NO_3)_2 \cdot 6H_2O$) and nickel nitrate hexahydrate ($Ni(NO_3)_2 \cdot 6H_2O$) were used as precursors. After stirring the precursors for 1 hour, 20 mL of a viscous violet solution was put in a hydrothermal synthesis reactor. Then, hydrothermal synthesis was conducted by heating in an oven at 150° C. for 6 hours. After the heating, followed by natural cooling to room temperature, the produced precipitate was washed using distilled water and ethanol. The washed precipitate was dried at 60° C. in vacuo for at least 12 hours, put in an alumina crucible and heat-treated at 400° C. Then, sintering was conducted with a heating rate of 5° C./min at 400° C. for 2 hours. After the heating, the product was cooled naturally to room temperature.

Comparative Example 1. Preparation of Cobalt Molybdenum Oxide

Cobalt molybdenum oxide known as the existing anode electrode material for a sodium secondary battery was prepared under the same condition described in Example 1, except for the nickel nitrate $(Ni(NO_3)_2 \cdot 6H_2O)$ precursor.

Example 2. Preparation of Sodium Battery

After mixing the anode electrode material prepared in Example 1, a conductive agent (Denka Black; DB) and a binder (polyvinylidene fluoride; PVDF) at a weight ratio of 80:10:10, a slurry was prepared by stirring in an N-methylpyrrolidone (NMP) solvent. After spreading the slurry on a copper foil, an electrode was formed by drying at 80° C. in vacuo for 12 hours. After natural cooling, the electrode was shaped into a disc with a diameter of 12 mm inside a glovebox. A CR2032-type coin cell was prepared using the same. Glass fiber was used as a separator and sodium metal was used as a counter electrode. As an electrolytic solution, 2 vol % FEC (fluoroethylene carbonate) added to a 1:1:1 (v/v/v) mixture of EC, DEC and PC in which 1 M $NaPF_6$ was dissolved was used.

Comparative Example 2. Preparation of Sodium Battery

A sodium battery was prepared in the same manner as in Example 2, except for using the anode electrode material prepared according to Comparative Example 1 instead of the anode electrode material prepared according to Example 1.

Test Example 1. Morphological and Elemental Analysis of Prepared Powder

Figure 2:
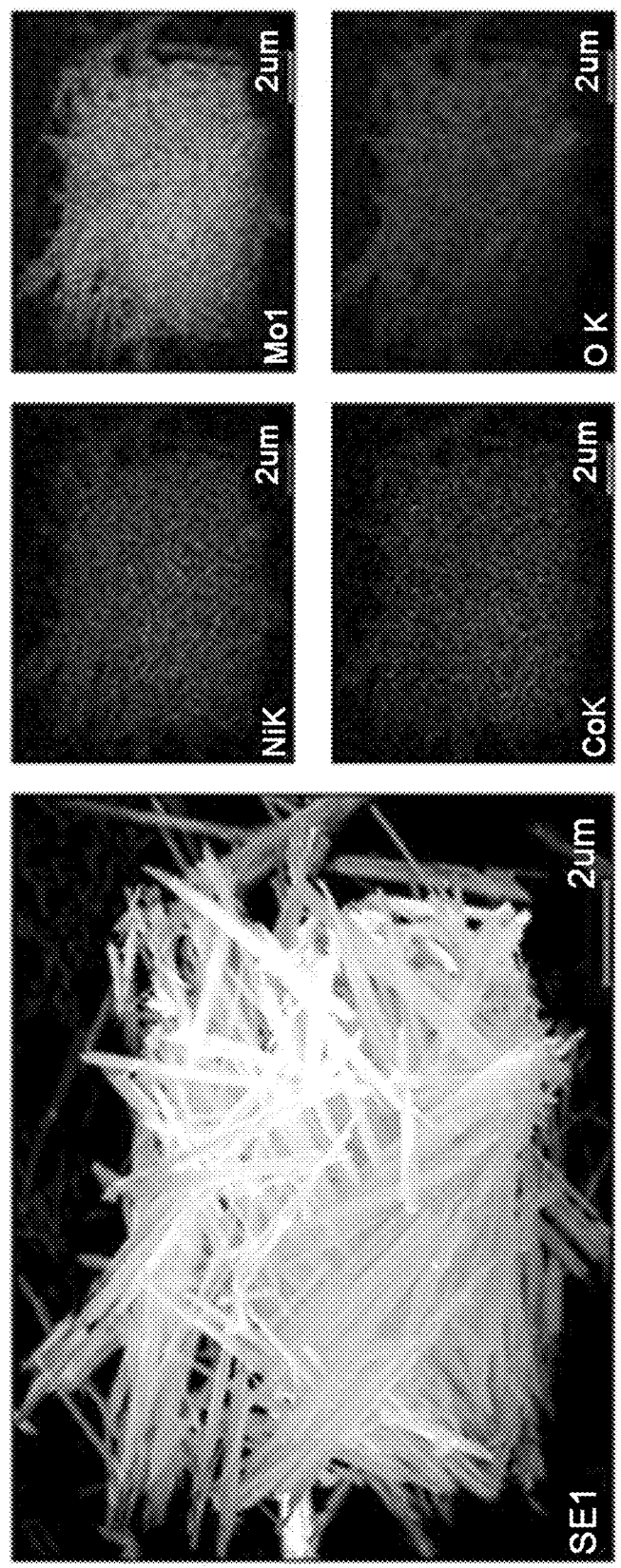
FIG. 2 shows the scanning electron microscope (SEM) image and elemental mapping result by EDAX for nickel cobalt molybdenum oxide according to an exemplary embodiment of the present disclosure.

It was investigated whether the powder was formed as desired through morphological and elemental analysis of the nickel cobalt molybdenum oxide prepared in Example 1. For this, the shape and particle size distribution of the fine powder was observed through scanning electron microscopy (SEM) and transmission electron microscopy (TEM) images and elemental analysis was conducted by scanning electron microscopy-based energy-dispersive spectroscopy (SEM-EDS). In addition, the crystal structure of the prepared powder was analyzed by transmission electron microscopy (TEM)-based selected area electron diffraction (SAED) pattern analysis. FIG. 2 shows the scanning electron microscope (SEM) image and elemental mapping result by EDAX for the nickel cobalt molybdenum oxide according to an exemplary embodiment of the present disclosure, and FIG. 3 shows the transmission electron microscopy (TEM) images and SAED pattern for the nickel cobalt molybdenum oxide according to an exemplary embodiment of the present disclosure.

Figure 3:
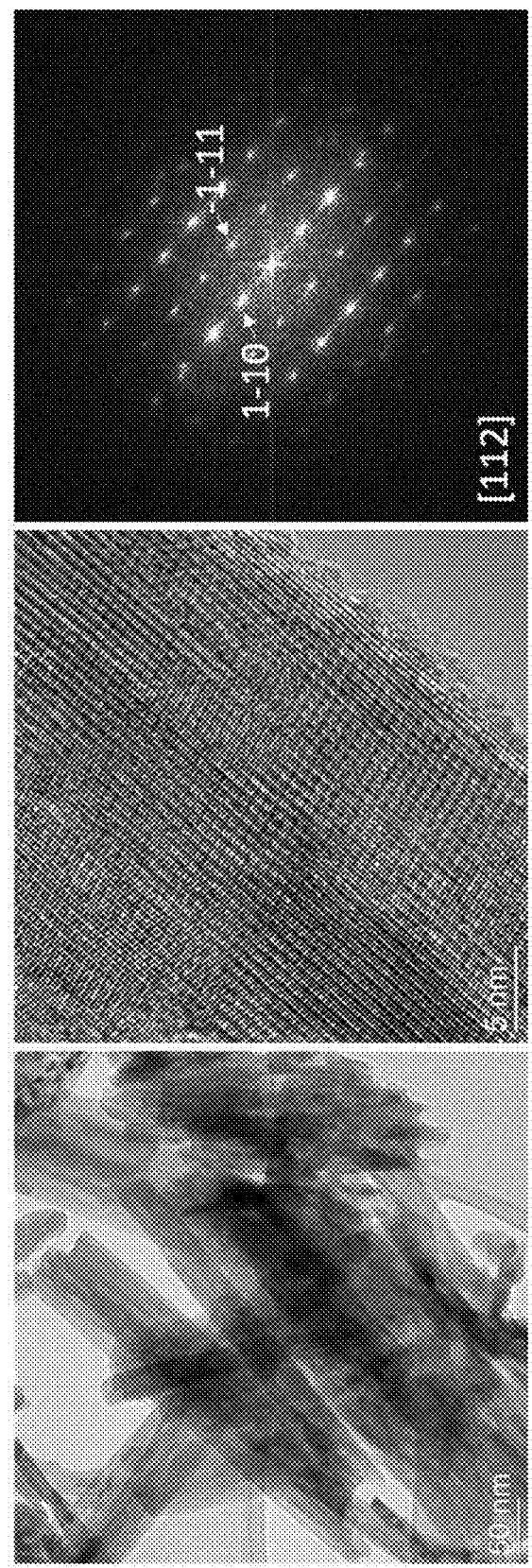
FIG. 3 shows the transmission electron microscopy (TEM) images and SAED pattern for nickel cobalt molybdenum oxide according to an exemplary embodiment of the present disclosure.

As can be seen from FIGS. 2 and 3, the prepared powder had a nanorod shape with a diameter of 50-100 nm, and had a crystal structure of nickel cobalt molybdenum oxide with uniform distribution of constituent elements.

Figure 4:
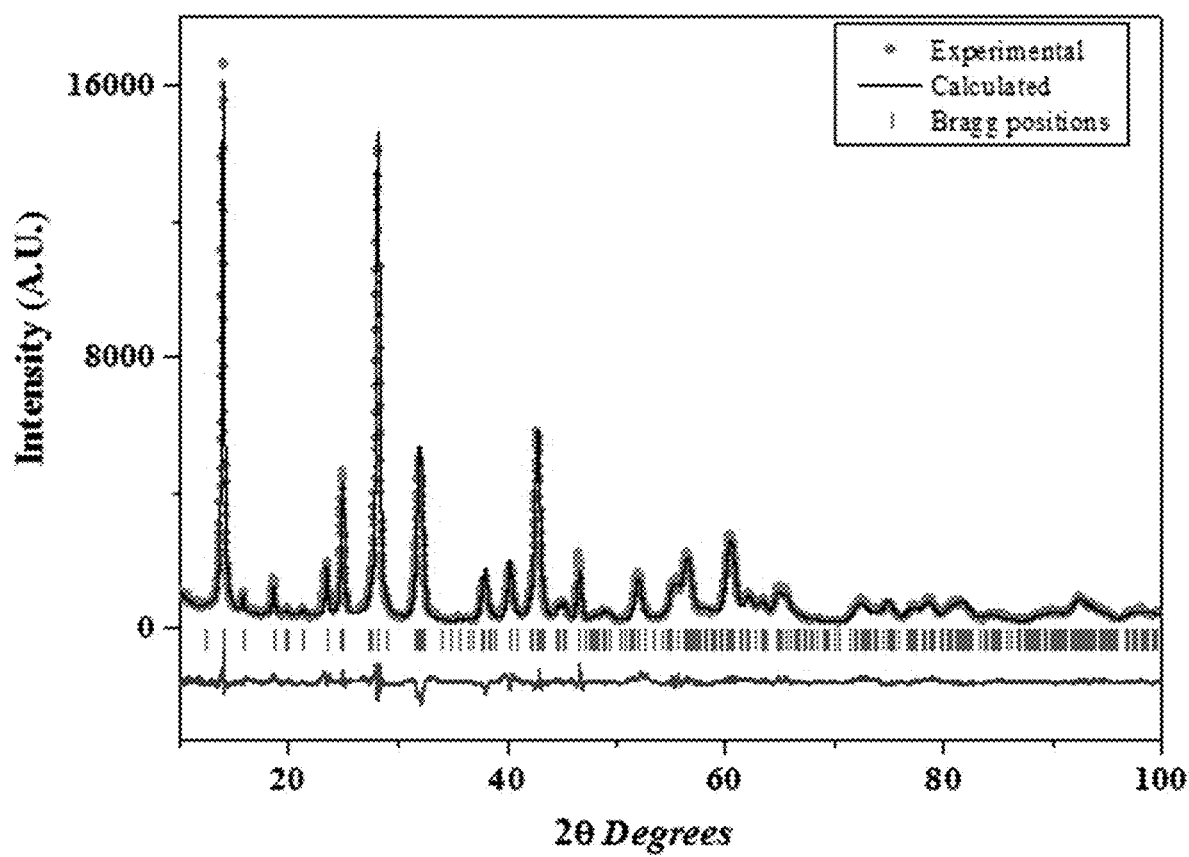
FIG. 4 shows a result of conducting radiation light accelerator-based high-resolution powder diffraction (HRPD) measurement and identifying crystal structure through Rietveld refinement analysis for nickel cobalt molybdenum oxide according to an exemplary embodiment of the present disclosure.

Test Example 2. Radiation Light Accelerator-Based Crystal Structure and Reaction Behavior Analysis For accurate crystal structure analysis of the nickel cobalt molybdenum oxide prepared in Example 1, crystal structure was analyzed by the Rietveld method using XRD data obtained from radiation light accelerator-based high-resolution powder diffraction (HRPD) measurement. FIG. 4 shows a result of conducting radiation light accelerator-based high-resolution powder diffraction (HRPD) measurement and identifying crystal structure through Rietveld refinement analysis for the nickel cobalt molybdenum oxide according to an exemplary embodiment of the present disclosure. The result is described in detail in Table 1.

TABLE 1

| Atom | Multiplicity | x | y | z | Occupancy | Uiso |
|---|---|---|---|---|---|---|
| Mo1 | 4 | 0.2828 (6) | 0 | 0.6377 (8) | 1.0 | 0.01 |
| Mo2 | 4 | 0 | 0.2852 (5) | 0 | 1.0 | 0.01 |
| Co1 | 4 | 0.3067 (10) | 0 | 0.1488 (13) | 1.00 | 0.01 |
| Ni1 | 4 | 0 | 0.3143 (8) | 0.5 | 1.00 | 0.01 |
| O1 | 8 | 0.5017 (22) | 0.1586 (34) | 0.2244 (30) | 1.0 | 0.02 |
| O2 | 8 | 0.1654 (30) | 0.1783 (29) | 0.084 (4) | 1.0 | 0.02 |
| O3 | 8 | 0.1665 (27) | 0.1471 (25) | 0.5744 (31) | 1.0 | 0.02 |
| O4 | 4 | 0.343 (4) | 0 | 0.430 (5) | 1.0 | 0.02 |
| O5 | 4 | 0.359 (4) | 0 | 0.921 (5) | 1.0 | 0.02 |

Space group: C2/m, a=9.6587(10) Å, b=8.8142(9) Å, c=7.6653 4) Å, β=114.096°, V=595.7(3) Å$^3$. Agreement factors: $R_{wp}$=8.24%, $R_p$=6.24%, $R_F^2$=5.09%.

As can be seen from FIG. 4 and Table 1, the nickel cobalt molybdenum oxide prepared in Example 1 had single phase $Ni_{0.5}Co_{0.5}MoO_4$.

Figure 5:
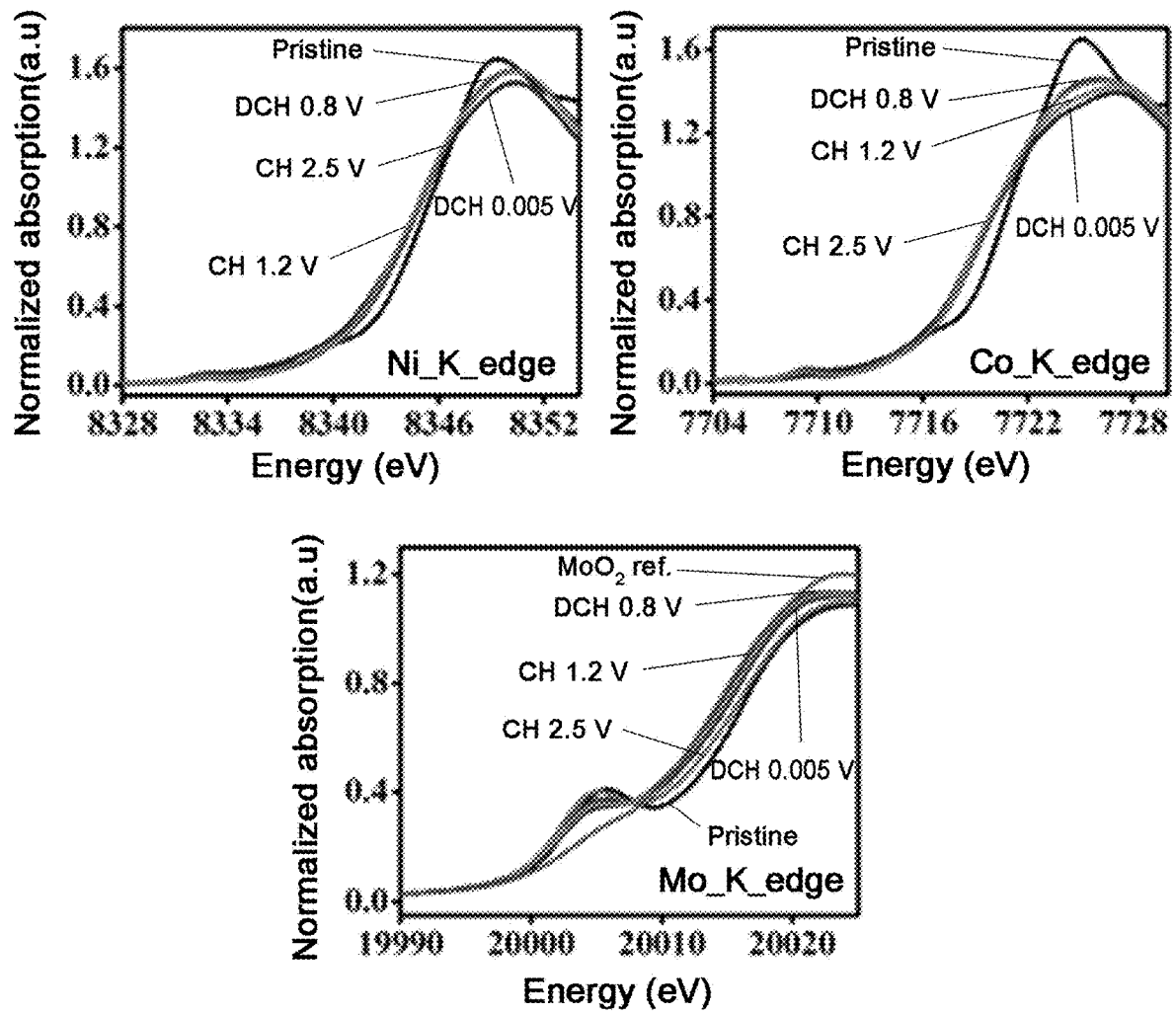
FIG. 5 shows a result of conducting radiation light accelerator-based X-ray absorption near edge structure (XANES) analysis for identifying the reaction behavior of the constituent elements of a sodium secondary battery using nickel cobalt molybdenum oxide according to an exemplary embodiment of the present disclosure depending on charge/discharge voltage.

In addition, after preparing the sodium secondary battery using the nickel cobalt molybdenum oxide in Example 2, reaction behavior during charge/discharge was analyzed by radiation light accelerator-based X-ray absorption spectroscopy and in-situ X-ray diffraction spectroscopy. FIG. 5 shows a result of conducting radiation light accelerator-based X-ray absorption near edge structure (XANES) analysis for identifying the reaction behavior of the constituent elements of the sodium secondary battery using the nickel cobalt molybdenum oxide according to an exemplary embodiment of the present disclosure depending on charge/discharge voltage, and FIG. 6 shows a result of conducting radiation light accelerator-based in-situ X-ray diffraction (XRD) analysis in order to investigate reaction mechanism during charge/discharge of the sodium secondary battery using the nickel cobalt molybdenum oxide according to an exemplary embodiment of the present disclosure.

Figure 6:
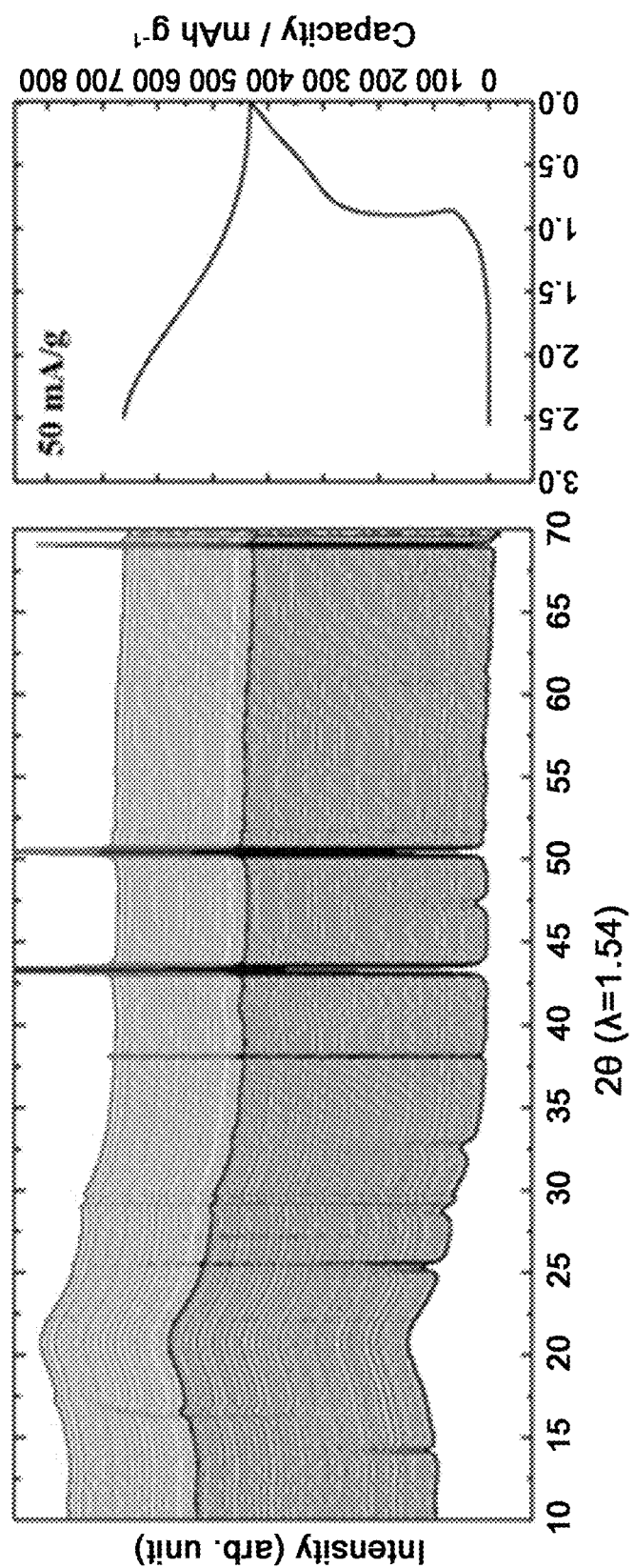
FIG. 6 shows a result of conducting radiation light accelerator-based in-situ X-ray diffraction (XRD) analysis in order to investigate reaction mechanism during charge/discharge of a sodium secondary battery using nickel cobalt molybdenum oxide according to an exemplary embodiment of the present disclosure.

The crystal structure of the prepared novel nickel cobalt molybdenum oxide was confirmed from FIGS. 5 and 6. It was confirmed that, unlike the existing metal oxides, the intercalation/deintercalation of sodium ion occurred during charge/discharge.

Test Example 3. Evaluation of Electrochemical Characteristics

Figure 7:
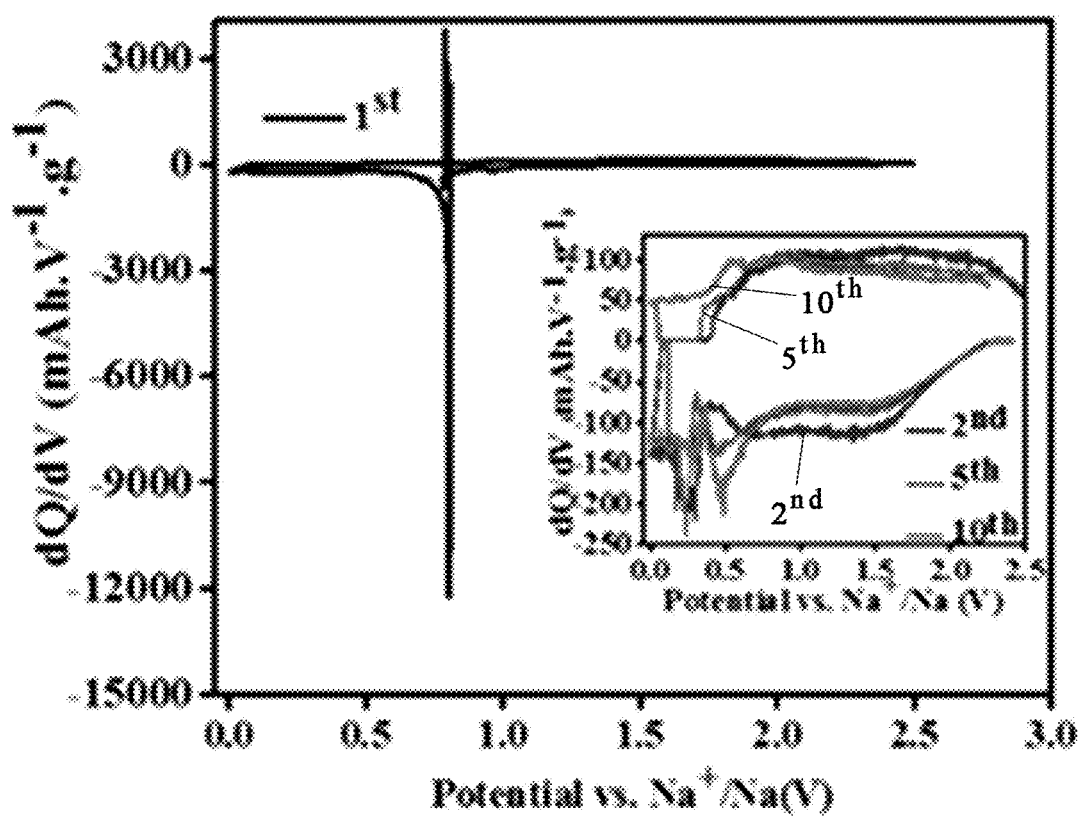
FIG. 7 is a dQ/dV graph showing the result of electrochemical reaction of a sodium secondary battery using nickel cobalt molybdenum oxide according to an exemplary embodiment of the present disclosure depending on voltage.
Figure 8:
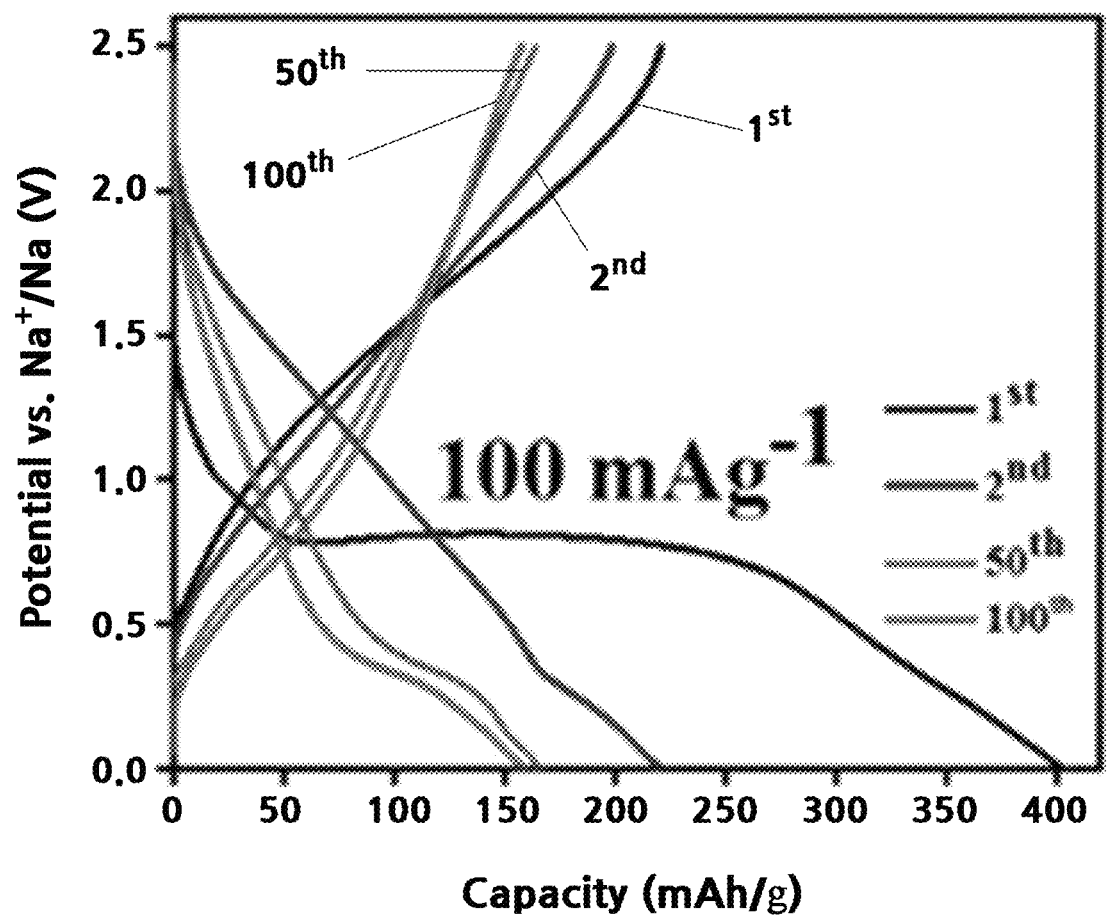
FIG. 8 shows the charge/discharge characteristics of a sodium secondary battery using nickel cobalt molybdenum oxide according to an exemplary embodiment of the present disclosure.

For evaluation of the electrochemical characteristics of the nickel cobalt molybdenum oxide prepared in Example 1, a sodium secondary battery was prepared using the nickel cobalt molybdenum oxide in Example 2 and then electrochemical characteristics were evaluated. First, electrochemical reaction depending on voltage was investigated by analyzing the dQ/dV graph for the 1st, 2nd, 5th and 10th cycles in a voltage range of 0.005-2.5 V vs. Na$^+$/Na using the Maccor 4000 charge/discharge device, and the profile of the charge/discharge curve for the 1st, 2nd, 50th and 100th cycles was investigated. FIG. 7 is a dQ/dV graph showing the result of electrochemical reaction of the sodium secondary battery using the nickel cobalt molybdenum oxide according to an exemplary embodiment of the present disclosure depending on voltage, and FIG. 8 shows the charge/discharge characteristics of the sodium secondary battery using the nickel cobalt molybdenum oxide according to an exemplary embodiment of the present disclosure.

Figure 9:
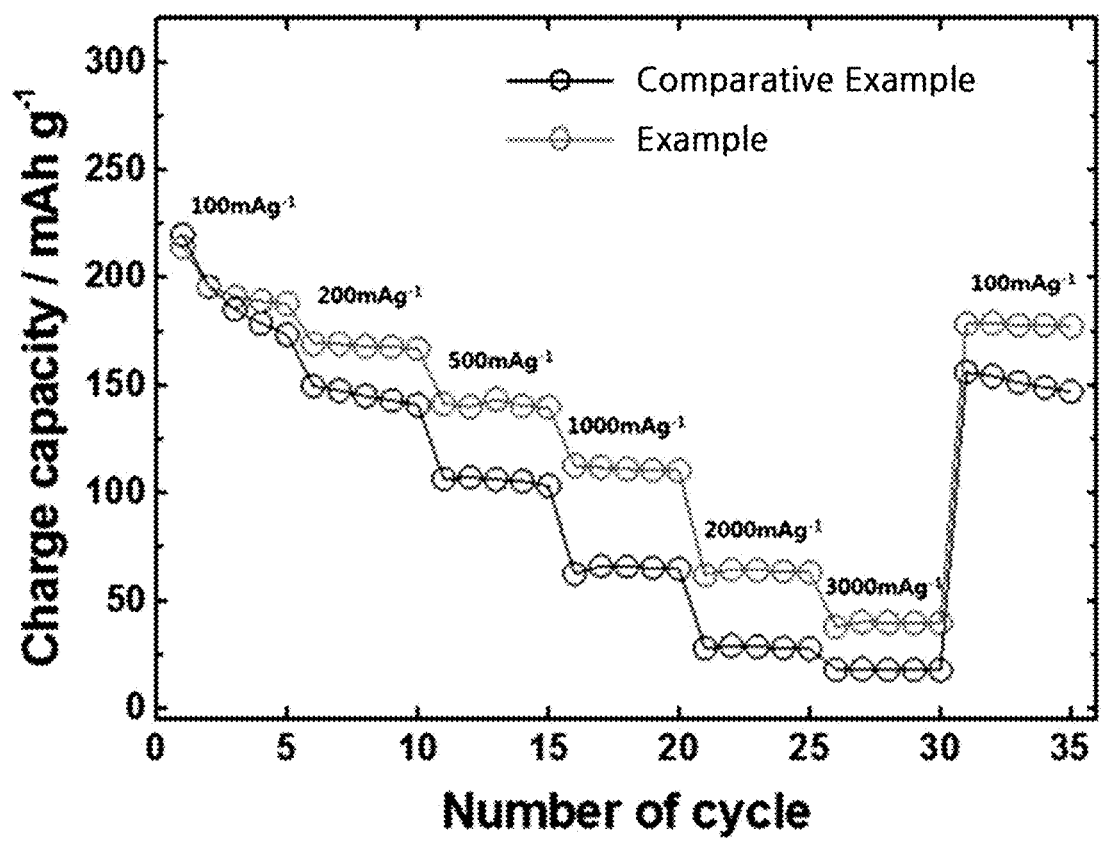
FIG. 9 is a graph comparing the high-rate capability of sodium secondary batteries using anode electrode materials of Example and Comparative Example according to the present disclosure.
Figure 10:
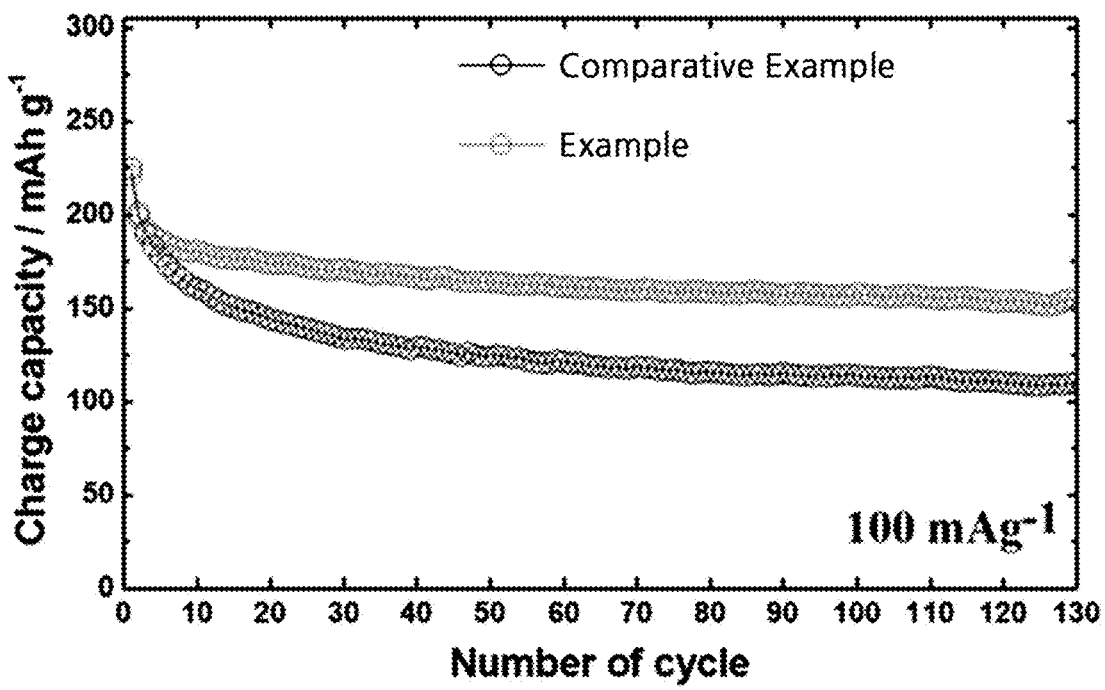
FIG. 10 is a graph comparing the life characteristics of sodium secondary batteries using anode electrode materials of Example and Comparative Example according to the present disclosure under the current condition of 100 $mAg^{-1}$.
Figure 11:
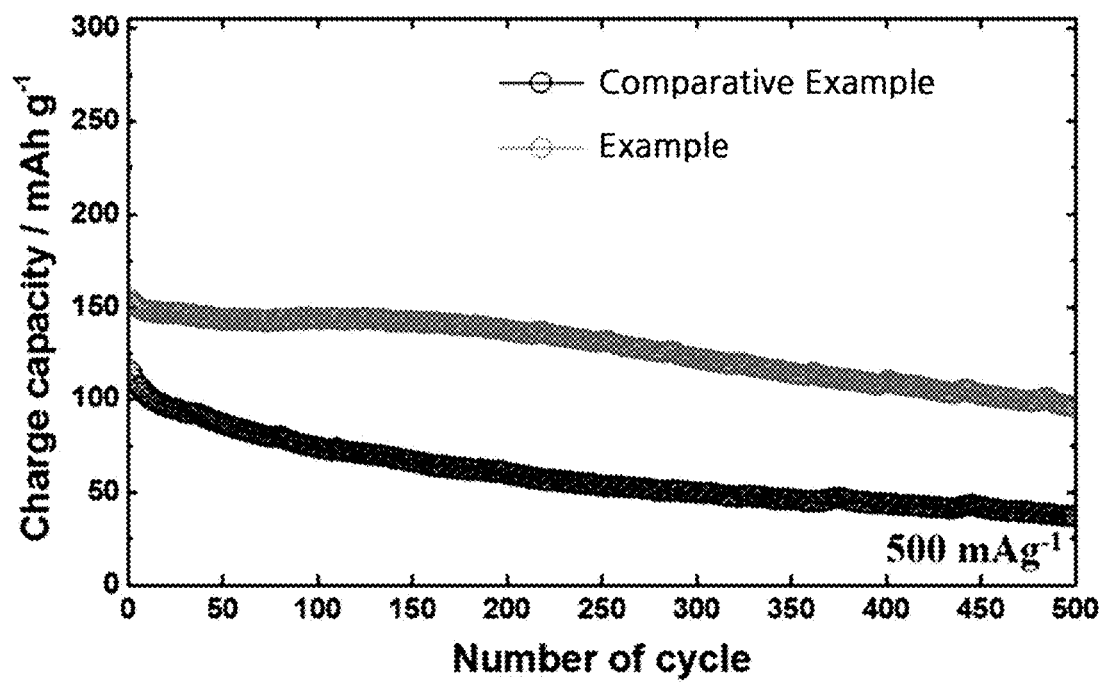
FIG. 11 is a graph comparing the life characteristics of sodium secondary batteries using anode electrode materials of Example and Comparative Example according to the present disclosure under the current condition of 500 $mAg^{-1}$.

In addition, after preparing sodium secondary batteries in Example 2 and Comparative Example 2 using the powders prepared in Example 1 and Comparative Example 1, respectively, output characteristics depending on current density were evaluated by conducting charge/discharge for 5 cycles under the current density conditions of 100 mA/g, 200 mA/g, 500 mA/g, 1000 mA/g, 2000 mA/g and 3000 mA/g, and life characteristics were evaluated under the current density conditions of 100 mA/g and 500 mA/g. FIG. 9 is a graph comparing the high-rate capability of the sodium secondary batteries using the anode electrode materials of Example and Comparative Example according to the present disclosure. FIG. 10 is a graph comparing the life characteristics of the sodium secondary batteries using the anode electrode materials of Example and Comparative Example according to the present disclosure under the current condition of 100 mAg$^{-1}$. FIG. 11 is a graph comparing the life characteristics of the sodium secondary batteries using the anode electrode materials of Example and Comparative Example according to the present disclosure under the current condition of 500 mAg$^{-1}$.

As seen from the output characteristics and life characteristics evaluation results shown in FIGS. 9-11, the novel nickel cobalt molybdenum oxide of Example 1 showed remarkably superior electrochemical characteristics as compared to the cobalt molybdenum oxide of Comparative Example 1.

Test Example 4. Evaluation of Crystal Structure and Electrochemical Characteristics Depending on Composition In order to compare the difference in physical properties and electrochemical characteristics of nickel cobalt molybdenum oxide depending on composition, Ni$_{0.45}$Co$_{0.55}$MoO$_4$ and Ni$_{0.55}$Co$_{0.45}$MoO$_4$ were synthesized under the same condition as in Example 1. After preparing sodium secondary batteries under the same condition as in Example 2 using the synthesized powders, electrochemical characteristics were evaluated.

Figure 12:
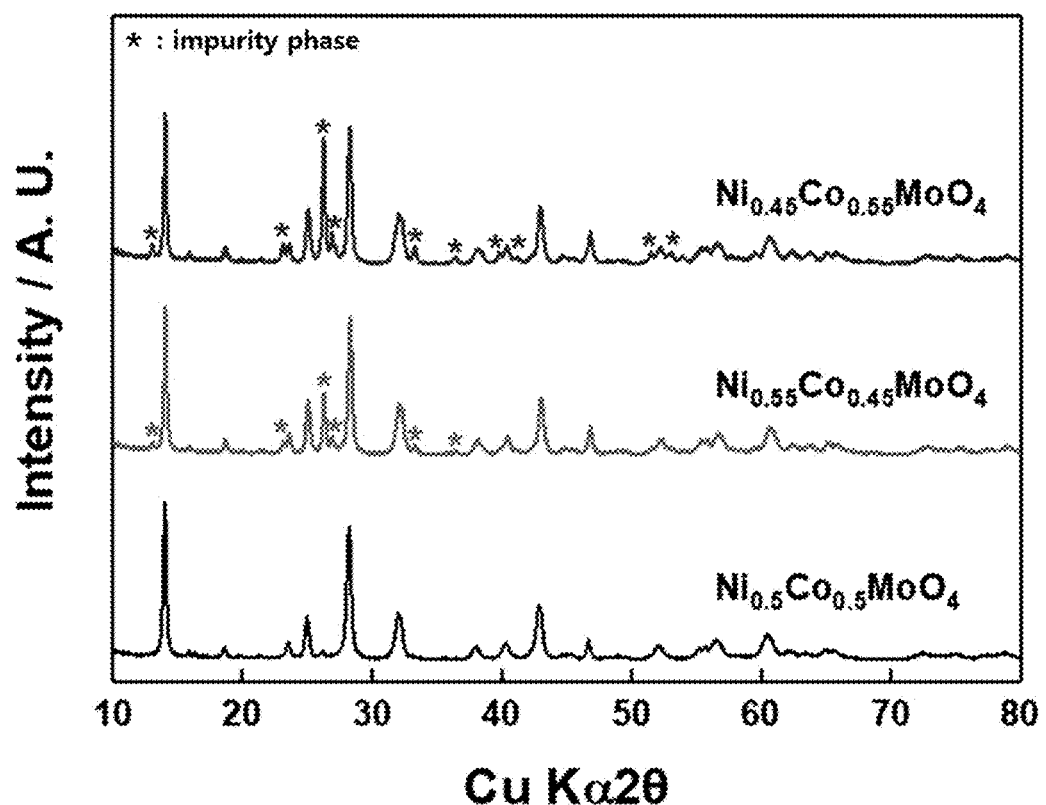
FIG. 12 shows the XRD measurement data of $Ni_{0.45}Co_{0.55}MoO_4$ and $Ni_{0.55}Co_{0.45}MoO_4$ for comparing physical properties with $Ni_{0.5}Co_{0.5}MoO_4$ according to an exemplary embodiment of the present disclosure.

FIG. 12 shows the XRD measurement data of Ni$_{0.45}$Co$_{0.55}$MoO$_4$ and Ni$_{0.55}$Co$_{0.45}$MoO$_4$ for comparing physical properties with Ni$_{0.5}$Co$_{0.5}$MoO$_4$ according to an exemplary embodiment of the present disclosure. As a result of the XRD measurement of Ni$_{0.45}$Co$_{0.55}$MoO$_4$ and Ni$_{0.55}$Co$_{0.45}$MoO$_4$, it was found out that a single phase and a secondary phase of nickel cobalt molybdenum oxide exist together and the oxide does not have a single crystal structure.

Figure 13:
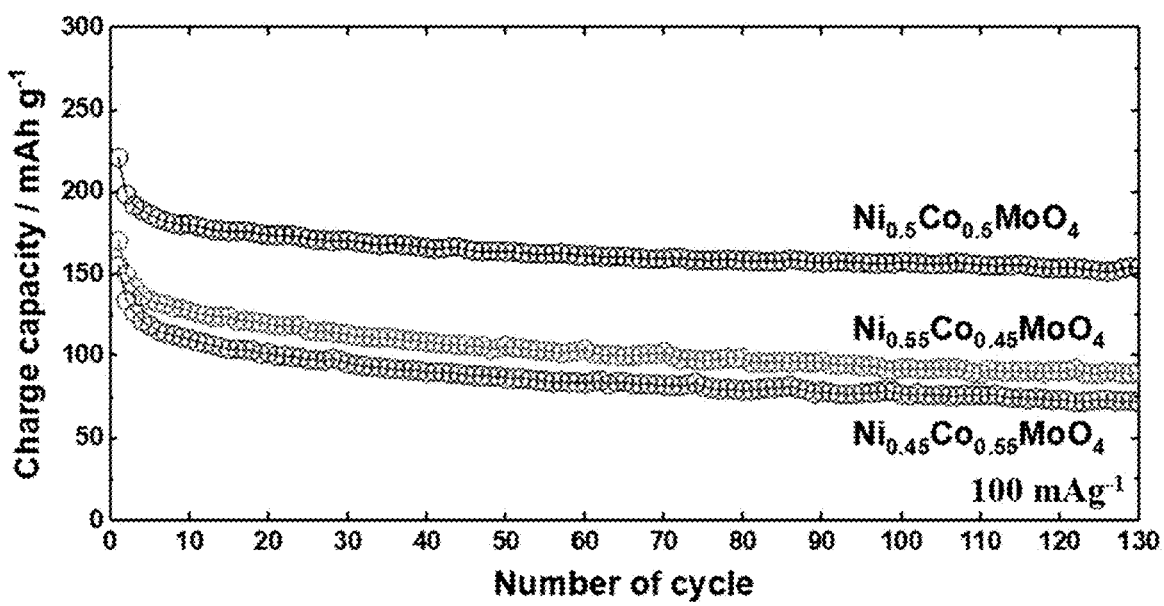
FIG. 13 shows data for evaluating the life characteristics of $Ni_{0.45}Co_{0.55}MoO_4$ and $Ni_{0.55}Co_{0.45}MoO_4$ for comparing electrochemical properties with $Ni_{0.5}Co_{0.5}MoO_4$ according to an exemplary embodiment of the present disclosure under the current condition of 100 $mAg^{-1}$.
Figure 14:
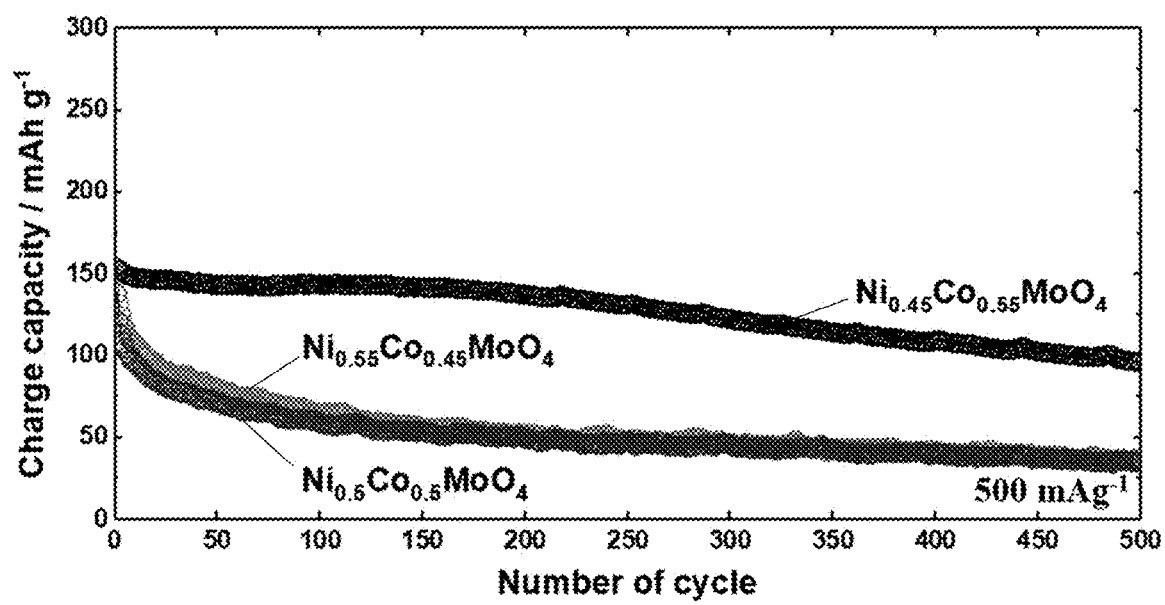
FIG. 14 shows data for evaluating the life characteristics of $Ni_{0.45}Co_{0.55}MoO_4$ and $Ni_{0.55}Co_{0.45}MoO_4$ for comparing electrochemical properties with $Ni_{0.5}Co_{0.5}MoO_4$ according to an exemplary embodiment of the present disclosure under the current condition of 500 $mAg^{-1}$.

FIG. 13 and FIG. 14 show data of evaluating the life characteristics of Ni$_{0.45}$Co$_{0.55}$MoO$_4$ and Ni$_{0.55}$Co$_{0.45}$MoO$_4$ for comparison of electrochemical properties with Ni$_{0.5}$Co$_{0.5}$MoO$_4$ depending on composition. FIG. 13 shows the graphs comparing life characteristics under the current condition of 100 mAg$^{-1}$, and FIG. 14 shows the graphs comparing life characteristics under the current condition of 500 mAg$^{-1}$. As a result of comparing life characteristics for the compositions of Ni$_{0.45}$Co$_{0.55}$MoO$_4$ and Ni$_{0.55}$Co$_{0.45}$MoO$_4$, it was confirmed that the Ni$_{0.5}$Co$_{0.5}$MoO$_4$ composition exhibits superior characteristics.

From the results of FIG. 12, FIG. 13 and FIG. 14, it was confirmed that the optimal composition of nickel cobalt molybdenum oxide was Ni$_x$Co$_{1-x}$MoO$_4$(0.45<x<0.55).

Accordingly, the novel anode electrode material for a sodium secondary battery containing nickel cobalt molybdenum oxide according to the present disclosure allows intercalation/deintercalation reaction of sodium ion during charge/discharge and does not undergo significant volume change during the intercalation reaction because structure is maintained stably during repeated charge/discharge. As a result, electrode damage and electric short circuit are decreased and, thus, improved electrochemical characteristics can be achieved in long-life and high-rate capability.

In addition, the novel anode electrode material for a sodium secondary battery containing nickel cobalt molybdenum oxide is advantageous in that it can be synthesized easily via a simple process such as a one-pot reaction based on a hydrothermal synthesis process.

The foregoing examples and comparative examples of the present disclosure are provided for illustrative purposes and the present disclosure is not limited by them. Those of ordinary skill in the art to which the present disclosure belongs will be able to carry out the present disclosure by making various changes thereto. Therefore, the scope of technical protection of the present disclosure should be defined by the appended claims.

What is claimed is:

1. A sodium secondary battery, comprising:
    an anode having an anode electrode active material comprising nickel cobalt molybdenum oxide represented by Chemical Formula 1,
    wherein the nickel cobalt molybdenum oxide is comprised of a single phase of Chemical Formula 1 and is in the form of a nanorod:

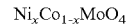    [Chemical Formula 1]

$$Ni_xCo_{1-x}MoO_4$$

wherein x satisfies 0.45<x<0.55;
    a cathode; and
    an electrolytic solution,
    wherein the anode electrode active material comprising the nickel cobalt molybdenum oxide is capable of intercalation and deintercalation of sodium ions.

2. The sodium secondary battery according to claim 1, wherein the nanorod has a diameter of 50-100 nm.

3. An anode electrode active material for a sodium secondary battery, comprising the nickel cobalt molybdenum oxide prepared by a method comprising:
    a step of preparing a precursor mixture by dissolving a nickel precursor, a cobalt precursor and a molybdenum precursor in a solvent (step 1);
    a step of conducting hydrothermal reaction of the precursor mixture of the step 1 as a reactant (step 2), wherein the hydrothermal reaction is performed at a temperature of 130-180° C. for 4-9 hours and at a pressure of 0.4-0.6 MPa; and
    a step of heat-treating the product of the step 2 (step 3), wherein the heat treatment is performed with a heating rate of 1-10° C./min at a temperature of 300-500° C. for 3-5 hours, wherein the nickel cobalt molybdenum oxide is comprised of a single phase of Chemical Formula 1 and is in the form of a nanorod:

$$Ni_xCo_{1-x}MoO_4 \quad \text{[Chemical Formula 1]}$$

wherein x satisfies $0.45<x<0.55$.

4. The anode electrode active material according to claim 3, wherein the nanorod has a diameter of 50-100 nm.

5. An anode electrode for a sodium secondary battery, comprising the anode electrode active material of claim 3.

* * * * *